_US011959021B2_

United States Patent
Laycock et al.

(10) Patent No.: US 11,959,021 B2
(45) Date of Patent: Apr. 16, 2024

(54) PROPPANT FROM CAPTURED CARBON

(71) Applicant: CONOCOPHILLIPS COMPANY, Houston, TX (US)

(72) Inventors: Dallin P Laycock, Houston, TX (US); Charlotte Plombin, Houston, TX (US); Samuel K Huisman, Houston, TX (US)

(73) Assignee: CONOCOPHILLIPS COMPANY, Houston, TX (US)

(*) Notice: Subject to any disclaimer, the term of this patent is extended or adjusted under 35 U.S.C. 154(b) by 0 days.

(21) Appl. No.: 18/301,363

(22) Filed: Apr. 17, 2023

(65) Prior Publication Data
US 2023/0250330 A1    Aug. 10, 2023

Related U.S. Application Data

(62) Division of application No. 17/736,087, filed on May 3, 2022, now Pat. No. 11,643,593.

(60) Provisional application No. 63/201,662, filed on May 7, 2021.

(51) Int. Cl.
  *C09K 8/80* (2006.01)
  *E21B 43/267* (2006.01)

(52) U.S. Cl.
  CPC .............. *C09K 8/805* (2013.01); *C09K 8/80* (2013.01); *E21B 43/267* (2013.01)

(58) Field of Classification Search
  CPC ....................................................... E21B 43/26
  See application file for complete search history.

(56) References Cited

U.S. PATENT DOCUMENTS

| | | | |
|---|---|---|---|
| 4,078,609 | A | 3/1978 | Pavlich |
| 6,753,299 | B2 | 6/2004 | Lunghofer et al. |
| 7,067,456 | B2 | 6/2006 | Fan et al. |
| 7,521,389 | B2 | 4/2009 | Shmotev et al. |
| 7,753,618 | B2 | 7/2010 | Constantz et al. |
| 7,914,892 | B2 | 3/2011 | Smith et al. |
| 8,367,025 | B2 | 2/2013 | Comrie |
| 8,470,282 | B2 | 6/2013 | Jensen et al. |
| 8,818,736 | B2 | 8/2014 | Nouvelle |
| 9,074,465 | B2 | 7/2015 | Abivin et al. |
| 9,266,057 | B1 | 2/2016 | Jones et al. |
| 9,688,900 | B2 | 6/2017 | Beuterbaugh et al. |
| 9,707,513 | B2 | 7/2017 | Constantz et al. |
| 10,011,765 | B2 | 7/2018 | Kropf |

(Continued)

FOREIGN PATENT DOCUMENTS

WO    2019231334 A1    12/2019

OTHER PUBLICATIONS

Czaplicka, N; Konopacka-Kyskawa, D. "Utilization of gaseous carbon dioxide and industrial Ca-rich waste for calcium carbonate precipitation: a review." Energies (2020), 13 (23), 6239.

(Continued)

*Primary Examiner* — Angela M DiTrani Leff
*Assistant Examiner* — Avi T Skaist
(74) *Attorney, Agent, or Firm* — Boulware & Valoir PLLC

(57) ABSTRACT

Method of making and using a proppant from captured carbon in either a carbon mineralization process or in a carbon nanomaterial manufacturing process is discussed, followed by treatments to ensure the quality control of the proppants so that they are suitable for use in hydraulic and other reservoir fracturing methods.

18 Claims, 6 Drawing Sheets

(56) References Cited

U.S. PATENT DOCUMENTS

| | | |
|---|---|---|
| 10,343,199 B2 | 7/2019 | Hills et al. |
| 10,960,350 B2 | 3/2021 | Constantz et al. |
| 11,344,861 B2 | 5/2022 | Constantz et al. |
| 2015/0114640 A1 | 4/2015 | Bestaoui-Spurr et al. |
| 2017/0066962 A1* | 3/2017 | Ravi ............... C04B 35/597 |
| 2019/0119158 A1 | 4/2019 | Hills et al. |
| 2020/0332179 A1* | 10/2020 | Santra ............... C01B 32/162 |
| 2020/0370001 A1 | 11/2020 | Constantz et al. |

OTHER PUBLICATIONS

Li, L.; Shi, Z.; Gao, B.; Hu; Wang, Z. "Electrochemical conversion of $CO_2$ to carbon and oxygen in LiCl—$Li_2O$ melts." Electrochimica Acta (2015) 190, 655-658.

Li, Z.; Yu, Y.; Li, W.; Wang, G.; Peng, L.; Li, J.; Gu, D.; Yuan, D.; Wu, H. "Carbon dioxide electrolysis and carbon deposition in alkalike-earth-carbonate-included molten salts electrolyzer." New Journal of Chemistry (2018) 42 (19).

Liu, M.; Gadikota, G. "Integrated $CO_2$ capture, conversion, and storage to produce calcium carbonate using an amine looping strategy." Energy Fuels (2019), 33, 3, 1722-1733.

McCollum, T. M.; Klein, F.; Solheid, P.; Moskowitz, B. "The effect of pH on rates of reaction and hydrogen generation during serpentinization." Phi. Trans. R Soc. A 378:20180428 (2020).

\* cited by examiner

PROPPANT FROM CAPTURED CARBON

PRIOR RELATED APPLICATIONS

This application is a DIVISIONAL application of U.S. Ser. No. 17/736,087, entitled PROPPANT FROM CAPTURED CARBON, filed May 3, 2022, which claims priority to U.S. Ser. No. 63/201,662, entitled PROPPANT FROM CAPTURED CARBON, filed May 7, 2021. Each is incorporated by reference in its entirety for all purposes.

FEDERALLY SPONSORED RESEARCH STATEMENT

Not applicable.

FIELD OF THE DISCLOSURE

The disclosure generally relates to methods, products and systems for fracturing shale formations and thereby sequestering carbon.

BACKGROUND OF THE DISCLOSURE

In many formations, chemical and/or physical processes alter the reservoir rock over geologic time. Sometimes, these diagenetic processes restrict the openings in the rock and reduce the ability of fluids to flow through the rock. If fluids cannot flow, it is difficult to produce oil, gas or water from a well. Thus, low permeability reservoirs are often fractured to increase their permeability and thereby increase the production of fluids.

Hydraulic fracturing is the process of pumping fluid into a wellbore at an injection rate that is too high for the formation to accept without breaking rock. During injection, the resistance to flow in the formation increases and the pressure in the wellbore increases to a value called the break-down pressure, that is the sum of the in situ compressive stress and the strength of the formation. Once the formation "breaks down," a fracture is formed, and injected fluid can then flow through it to the wellbore for production.

During a fracking job, a fluid not containing any solid (called the "pad") is injected first, until the fracture is wide enough to accept a propping agent. A fluid plus propping agent is injected next. The purpose of the propping agent is to keep apart the fracture surfaces once the pumping operation ceases (see e.g., FIG. 1). Frequently the frack fluids contain a gel to help carry the proppant deep into the reservoir.

Sand and ceramic proppant are two major types of proppants applied in the field. Comparing to the sand, ceramic proppant has higher hardness and sphericity, both ensure a large fracture conductivity especially at high effective closure stress. However, it is also more expensive—typically 3-5 times more expensive than sands (See FIG. 2). In deep reservoirs, man-made ceramic beads are used to hold open or "prop" the fracture, but in shallower reservoirs sand is typically used.

Although sand is inexpensive and an adequate propping agent for many fracking needs, it would be extremely beneficial to the planet as a whole if we could sequester carbon in some manner downhole, thus returning the carbon to the ground from which we have liberated it in the form of oil and natural gas. In 2016, hydraulically fractured horizontal wells accounted for 69% of all oil and natural gas wells drilled in the United States and 83% of the total linear footage drilled. Thus, any method that combines fracking and carbon sequestration has the potential to be transformational and significantly combat increasing $CO_2$ levels, especially where a given frack job uses millions of pounds of proppant.

SUMMARY OF THE DISCLOSURE

The disclosure is a novel propping agent made from captured carbon, and methods of making and using this novel propping agent.

Chemically, it is known that carbon dioxide may be sequestered by mineral carbonation. In carbon mineralization, $CO_2$ reacts with minerals rich in Ca and Mg to form carbonates, such as calcite ($CaCO_3$), magnesite ($MgCO_3$), and dolomite ($CaMg(CO_3)_2$), and often quartz ($SiO_2$). Some idealized reactions are as follows:

wollastonite $CaSiO_3 + CO_2 \rightarrow CaCO_3$ olivine $Mg_2SiO_4 + 2CO_2 \rightarrow 2MgCO_3 + SiO_2$ pyroxenes $CaMgSi_2O_6 + 2CO_2 \rightarrow CaMg(CO_3)_2 + 2SiO_2$ serpent polytypes $Mg_3Si_2O_5(OH)_4 + 3CO_2 \rightarrow 3MgCO_3 + 2SiO_2 + 2H_2O$ brucite $Mg(OH)_2 + CO_2 \rightarrow MgCO_3 + H_2O$ Although, mineral carbonation is known, and many are pursuing cost effective and efficient means of performing these reactions at scale, the issue of how to dispose of the product remains. Most proposals call for the production of various construction materials, and use of mineralization for concrete production, both to cure cement and to produce aggregate, is already economically viable in some cases. See e.g., Carbon8 System Ltd (UK), with a modular carbon capture system that produces >150,000 tonnes of product per year.

We propose using the carbonated mineral as a frac sand or proppant, rather than as building materials. The potential sequestration could be enormous, since as much as 0.3-13 million pounds of sand can be used to fracture a well and nearly 70 percent of all producing wells in the United States, including the vast majority of new wells, are hydraulically fractured. Indeed, some 120 million tons of frac sand were used in 2020 in the US and the usage is projected to continue to grow.

Indeed, companies are already making carbon capture carbonate aggregates for the construction industry, in sizes ranging from sand sized to gravel sized. Blue Planet, for example, uses recycled concrete in its remediation process as a means of obtaining calcium and alkalinity. $CO_2$ from flue gas is converted to carbonate by contacting $CO_2$ containing gas with a water-based capture solutions. See FIG. 4. The captured $CO_2$ does not require a purification step—an energy and capital intensive process. Thus, the method costs less than traditional methods of $CO_2$ capture. A facility is planned with capacity of 70,000 tons per year of coated lightweight aggregate and up to 500,000 tons per year of remediated recycled concrete aggregates (coarse and fine). Although still in the pilot stage, Chevron has invested 10 million dollars in this start-up.

A second option is to make a proppant from carbon nanomaterials (CNM), such as carbon nanofibers or carbon nanotubes. Many groups are making carbon products, but scalability on the order required may still present issues. There was only 161,200 metric tonnes (355 million pounds) of global carbon fiber capacity in 2019—an amount that is far short of what is needed on the fracking industry. However, carbon nanomaterials have the advantage that they can easily be made into a variety of shapes by molding and vacuum forming and their global capacity increases every year.

In addition, CNM, such as carbon nanofibers, carbon nanotubes, and graphene, are known to have extraordinary properties, such as having high strength and low weight. Thus, the making of proppants of specific size, shape and density is technically feasible and scalability will continue to improve over time.

Bergen Carbon Solutions, for example, has a modular process that includes the use of $CO_2$ from carbon capture facilities or $CO_2$ emission directly from factory chimneys as feedstock in CNM production. See FIG. 5 and FIG. 6. An electrolysis/heat process breaks the chemical bonding and pure carbon (C) can then be taken out of the production module and transferred to the filtration module which separates aggregates. In this instance, the filtration module may not be necessary, depending on the size of proppant needed. Remnant $CO_2$ is recycled back to the chimney system and oxygen ($O_2$) is emitted through a vented duct in the production module or sent back to the factory chimney system. The electricity needed for the CNM production is only 50 kWh per kg CNM and the capacity for a single module is 6.5 tonnes of CNM per year. In comparison, traditional CNM production methods require 1400 kWh per kg CNM on average.

In either case, the proppant should meet basic proppant requirements and typical ranges for some qualities are shown in Table 1 below. The quality control of the proppants is to be determined under ISO 13503-2 (1), incorporated by reference in its entirety for all purposes.

The carbon captured proppant should be sufficiently hard to meet its purpose. The crush resistance test is performed by crushing a sample of proppants under increasing stress. The highest stress level (rounded down to the nearest 1000 psi) under which the proppants generate no more than 10% crushed material is defined as the crush resistance (sometimes called the K-value). Higher the crush resistance is, better the proppants are. The crushing rate of ceramic proppants under a stress of 52 MPa is 5%, while the sands under a stress of 28 MPa is 9%, and the carbon capture proppants should at least meet the 9% at 28 MPa standard of sand, and a 5% rate or better would be even more preferred.

The carbon capture proppant should also be available in the required particle sizes. Size affects fracture conductivity and proppant transport and is measured in mesh size ranges defined by the number of openings across one linear inch of screen. Smaller the mesh size number is, larger the particle size is. Larger proppants provide higher fracture conductivity because the pore spaces present in the proppant pack are larger. However, larger proppants may crush more easily because there are fewer contact points or smaller contact areas to distribute the stress applied to the proppant pack. Also, larger proppants are more difficult to transport through the fracture, as they tend to settle out quickly unless there is sufficient porosity.

The range of particle sizes also affects the permeability/conductivity of a proppant pack, although particles can be size sorted so the method need not manufacture a narrow range of sizes. A wider range of particle sizes results in a tighter packing arrangement and lower permeability/conductivity. For example, 40/60-mesh proppants (a range of 20 mesh) will provide better permeability/conductivity than 40/70-mesh proppants (a range of 30 mesh).

Typical proppant sizes are generally between 8 and 140 mesh (106 µm-2.36 mm), for example 16-30 mesh (600 µm-1180 µm), 20-40 mesh (420 µm-840 µm), 30-50 mesh (300 µm-600 µm), 40-70 mesh (212 µm-420 µm) or 70-140 mesh (106 µm-212 µm). When it comes to determining if a frack sand meets accepted specs, at least 90% of the frack sand must fall within the marketed mesh size.

In addition, it would be a benefit, if not essential, if shape could be controlled. Proppant particle shape is measured by its sphericity and roundness. Sphericity is defined as the ratio of the surface area of a sphere to the surface area of the particle. The sphericity is 1 for a sphere and is less than 1 for any particle that is not a sphere. Roundness defines how smooth a grain is, and can be defined mathematically as the ratio of the average radius of curvature of the edges or corners to the radius of curvature of the maximum inscribed sphere.

FIG. 3 shows a visual chart that can be used for evaluating the sphericity and roundness of proppant grains. Ceramics typically achieve the roundness and sphericity of 0.9, while sands are typically in the 0.7 range, with some occasionally at 0.8. Proppant particles of higher sphericity and roundness will lead to greater conductivity. Higher sphericity and roundness also improve the crush resistance of the proppants.

Density affects proppant transport and is another important parameter. Proppant density comes with both bulk density and absolute density. The difference between the bulk and absolute densities results from the void spaces present in proppant packs. Bulk density includes both the proppant and the porosity and is measured by filling a known volume with dry proppant and measuring the weight. Apparent density excludes extra-granular porosity by placing a known mass in a volume of fluid and determining how much of the fluid is displaced (Archimedes). Absolute density is the density the material would have if no intra-granular porosity is present.

Typical porosity values of proppant packs are in the range between 0.35 and 0.43%. For natural sands, the absolute density usually ranges between 2.62 and 2.65 in specific gravity as compared to quartz dominated sane. For ceramic proppants, the absolute density usually ranges between 2.55 and 3.9 in specific gravity. The carbon capture proppants should be in this range, and it may be possible to change the density with coatings or by influencing void spaces/porosity.

Turbidity is a measure of clays, silts and other fine particulates present in the proppants. It is measured by a turbidity meter that looks at light refraction in water exposed to the proppants. The presence of clays and silts reduces conductivity. Turbidity can be removed by washing, so the presence of some fines in manufacturing is not problematic.

Acid solubility determines the percentage of acid soluble materials present in the proppants. Lower acid solubility indicates a smaller amount of "impurities" present in the proppants. These two specifications are generally provided by proppant suppliers for each type of proppants, but are more relevant for evaluating natural sands for fracturing applications. Calcium carbonate proppants would likely not be combined with acid etching or other acid treatments as they are expected to be acid soluble, thus this test may be omitted for this mineral.

Flowback of a proppant following fracture stimulation treatment is a major concern because of the damage to equipment caused by particulates entering equipment and potential loss in well production as wells are taken offline for repair. Coating proppants with a polymer can reduce flowback. Thermoplastic film materials, adhesive coated fibers, a poly(urethane) coating that slowly polymerizes after the fracturing treatment due to a polyaddition process and magnetic materials have all been developed to reduce the proppant flowback.

The carbon capture method can be carbon mineralization or carbon nanomaterial synthesis, using any method known in the art or to be developed, potentially followed by any processes needed to control proppant quality, such as washing, size sorting, coating, and the like.

The fracturing method can be any suitable methods or combinations of methods. Thus, the method could employ aspects of hydraulic fracking, thermal fracking, cryogenic fracking, electric fracking, explosive fracking, pneumatic fracking and the like.

Any preflush and afterflush procedures can be combined with the method. For example, preflush may be used to clean the rock and/or increase wettability. Afterflush may be used to clear out gels and other polymers.

Any suitable fracturing fluid can be used, although water-based frack fluids are likely to be preferred, probably with polymers to increase viscosity for proppant mobility. A number of fluids are described Table 2 below.

Corrosion inhibitors, demulsifiers, surface tension reducing agents, chemical retarding agents, clay stabilizers, friction reducers and other additives referred to above may be incorporated in the fracturing fluid if desired. Care should again be taken that the additives selected are compatible with the other components, as well as with the carrier fluid. Some commonly used additives are described below:

Surfactants: Surfactants are used to reduce surface and interfacial tension, to prevent emulsions, to water wet the formation, and to safeguard against other associated problems. Swabbing and clean-up time can be reduced by lowering surface tension.

Suspending Agents: Agents to suspend fines. Suspension should be differentiated from dispersion. Dispersed particles usually settle in a short time.

Sequestering Agents: Sequestering agents act to complex ions of iron and other metallic salts to inhibit precipitation of iron. Sequestering agents should always be used if rusty tubing or casing is to be contacted.

Anti-Sludge Agents: Some crudes, particularly heavy asphaltic crudes, form an insoluble sludge when contacted with acid. The primary ingredients of a sludge are usually asphaltenes, but sludges may also contain resins and paraffin waxes, high-molecular weight hydrocarbons, and formation fines or clays. Addition of certain surfactants can prevent sludge formation by keeping colloidal material dispersed.

Corrosion Inhibitors: Corrosion inhibitors temporarily slow down the reaction of acid on metal. Corrosion inhibition time varies with temperature, acid concentration, type of steel, and inhibitor concentration. Both organic and inorganic corrosion inhibitors have application in acidizing. Some organic inhibitors are effective up to the 300° F. (148.8° C.) range. Extenders have been developed to increase the effective range to 400° F. (204.4° C.). Inorganic arsenic inhibitor can be used up to at least 450° F. (232.2° C.).

Alcohol: Normally methyl or isopropyl alcohol in concentrations of 5% to 30% by volume can be used to lower surface tension. The use of alcohol in acid will accelerate the rate of well clean-up and improve clean-up, particularly in dry gas wells. Disadvantages are increased inhibitor problems and possible salt precipitation.

Fluid Loss Control Agents: Fluid loss control agents may be required to reduce leak-off, particularly in fracture acidizing. The preferred method of selecting fluid loss control agents is to run fluid loss tests on cores from the formation to be fracked.

Diverting or Bridging Agents: Fluids will usually follow the path of least resistance, usually the lesser damaged intervals, unless diverting or bridging agents are employed to allow relatively uniform treatment of various porous zones open to the wellbore.

The invention includes the following one or more embodiments, in any combination thereof:

A method of making a proppant for use in hydraulic fracturing of a well, said method comprising: a) capturing $CO_2$ from a gas or a liquid; b) reacting said $CO_2$ with magnesium or calcium ions in a carbon mineralization reaction under alkaline pH to make porous particles of magnesium carbonate or calcium carbonate; c) said particles having: i) a crushing rate of <10% at 28 MPa, ii) a bulk density of about 1.5-2.5 $g/cm^3$, iii) a size of about 0.1-2 mm, and iv) a porosity of about 30-50%; d) size sorting said particles to produce size ranges of between 20 mesh (e.g. 40-60 mesh range) and 40 mesh (e.g., a 20-60 mesh range), said size sorted particles being suitable for use as a proppant.

A method of making a proppant for use in hydraulic fracturing of a well, said method comprising: a) capturing $CO_2$ from a gas or a liquid; b) reacting said $CO_2$ with electricity or heat or both to produce carbon nanomaterial (CNM); c) optional sonication and/or filtration of said CNM; d) optional shaping said carbon nanomaterial by vacuum forming or molding or agglomeration; e) said CMN having: i) a crushing rate of <10% at 28 MPa, ii) a bulk density of 1.5-2.5 $g/cm^3$, iii) a size of 0.1-2 mm, and iv) a porosity of 30-50%; f) size sorting said CMN to produce size ranges of between 20 mesh (e.g. 40-60 mesh range) and 40 mesh (e.g., a 20-60 mesh range), said size sorted CNM being suitable for use as a proppant.

Any CNM proppant or CNM manufacturing method herein described, said heat being about 800° C.

A proppant made by any method herein described.

A method of producing oil or gas from an underground formation having at least one well, comprising the method steps of: a) introducing a first fracturing fluid (FF) through the at least one well into the underground formation at a pressure greater than a minimum in-situ rock stress for formation of fractures (FR) in the underground formation; b) introducing a second FF containing any proppant herein described through the at least one well into the underground formation to prop open said FR; and c) producing oil or gas from said at least one well.

Any proppant or method herein described, said particles further having a roundness of at least 0.7 and a sphericity of at least 0.7.

Any proppant or method herein described, said further comprising coating said particles with a resin, a thermoplastic polymer or an adhesive polymer.

Any proppant or method herein described, said further comprising combining said proppant with magnetic particles or with fibers.

Any proppant or method herein described, said particles having a crushing rate of <9% at 28 MPa, or <8, <7, <6 or <5 MPa or having a crushing rate of <10% at 40 MPa or at 50 MPa.

Any proppant or method herein described, said where said particles are agglomerated to produce sizes larger than 100 nm, 500 nm, 1 mm or 1.5 mm.

Any proppant or method herein described, said where said particles are agglomerated and coated to produce sizes larger than 100 nm, 500 nm, 1 mm or 1.5 mm.

Any proppant or method herein described, said, where $CO_2$ is captured from a flue gas stream and said magnesium or calcium ions are from recycled cement, brine or mining tailings.

A "fracture" is a crack, delamination, surface breakage, separation or other destruction within a geologic formation or fraction of formation not related to foliation or cleavage in metamorphic formation, along which there has been displacement or movement relative to an adjacent portion of the formation. A fracture along which there has been lateral displacement may be termed a fault. When walls of a fracture have moved only normal to each other, the fracture may be termed a joint. Fractures may enhance permeability of rocks greatly by connecting pores together, and for that reason, joints and faults may be induced mechanically in some reservoirs in order to increase fluid flow. Fractures may be natural or man-made.

A "transverse fracture" is a fracture that is more than 15 degrees deviated from the axis of the well bore, and is usually roughly perpendicular thereto. A "longitudinal" or "axial" fracture is oriented 15 degrees or less from the axis of the wellbore, e.g., substantially parallel to the wellbore.

A "hydraulic fracture" is a fracture at least partially propagated into a formation, wherein the fracture is created through injection of pressurized fluids into the formation. While the term "hydraulic fracture" is used, the techniques described herein are not limited to use in hydraulic fractures. The techniques may be suitable for use in any fractures created in any manner considered suitable by one skilled in the art. Hydraulic fractures may be substantially horizontal in orientation, substantially vertical in orientation, or oriented along any other plane. Generally, the fractures tend to be vertical at greater depths, due to the increased mass of the overburden.

As used herein, "hydraulic fracturing" is a process used to create fractures that extend from the wellbore into formations to stimulate the potential for production. A fracturing fluid, typically viscous, is generally injected into the formation with sufficient pressure, for example, at a pressure greater than the lithostatic pressure of the formation, to create and extend a fracture. A proppant may often be used to "prop" or hold open the created fracture after the hydraulic pressure used to generate the fracture has been released. Parameters that may be useful for controlling the fracturing process include the pressure of the hydraulic fluid, the viscosity of the hydraulic fluid, the mass flow rate of the hydraulic fluid, the amount of proppant, and the like.

The use of the word "a" or "an" when used in conjunction with the term "comprising" in the claims or the specification means one or more than one, unless the context dictates otherwise.

The term "about" means the stated value plus or minus the margin of error of measurement or plus or minus 10% if no method of measurement is indicated.

The use of the term "or" in the claims is used to mean "and/or" unless explicitly indicated to refer to alternatives only or if the alternatives are mutually exclusive.

The terms "comprise", "have", "include" and "contain" (and their variants) are open-ended linking verbs and allow the addition of other elements when used in a claim.

The phrase "consisting of" is closed, and excludes all additional elements.

The phrase "consisting essentially of" excludes additional material elements, but allows the inclusions of non-material elements that do not substantially change the nature of the invention, such as additives, preflush fluids or steps, afterflush fluids or steps, and the like. The transition phrases "comprise," "consisting of" and "consisting essentially of" in the claims are intended to be interchangeable, but in the interests of brevity the claims are not repeated three times herein with the three variations.

The following abbreviations are used herein:

| ABBREVIATION | TERM |
| --- | --- |
| Frack | Short for fracture, see also fracking |
| Fracking | Refers to fracturing a reservoir, e.g., inducing fracture formation. |
| CNM | Carbon nanomaterials, including CNM that have been treated by molding, pressure, and the like to reach mm size. |
| FF | Fracturing fluid |
| FR | Fractures |
| MPa | Megapascal |

DETAILED DESCRIPTION

Figure 1:
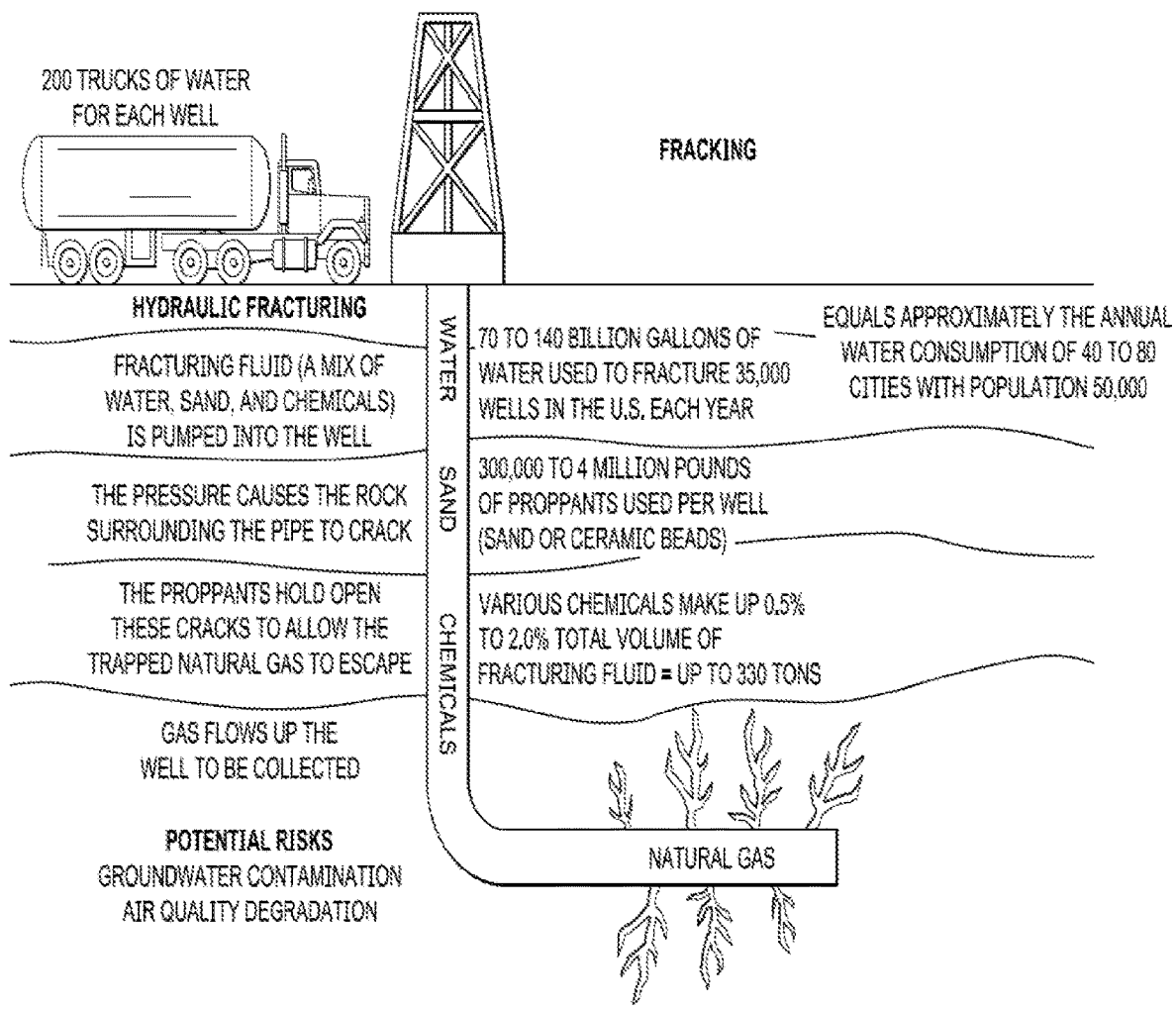
FIG. 1 Schematic of hydraulic fracturing of a natural gas reservoir.
Figure 2:
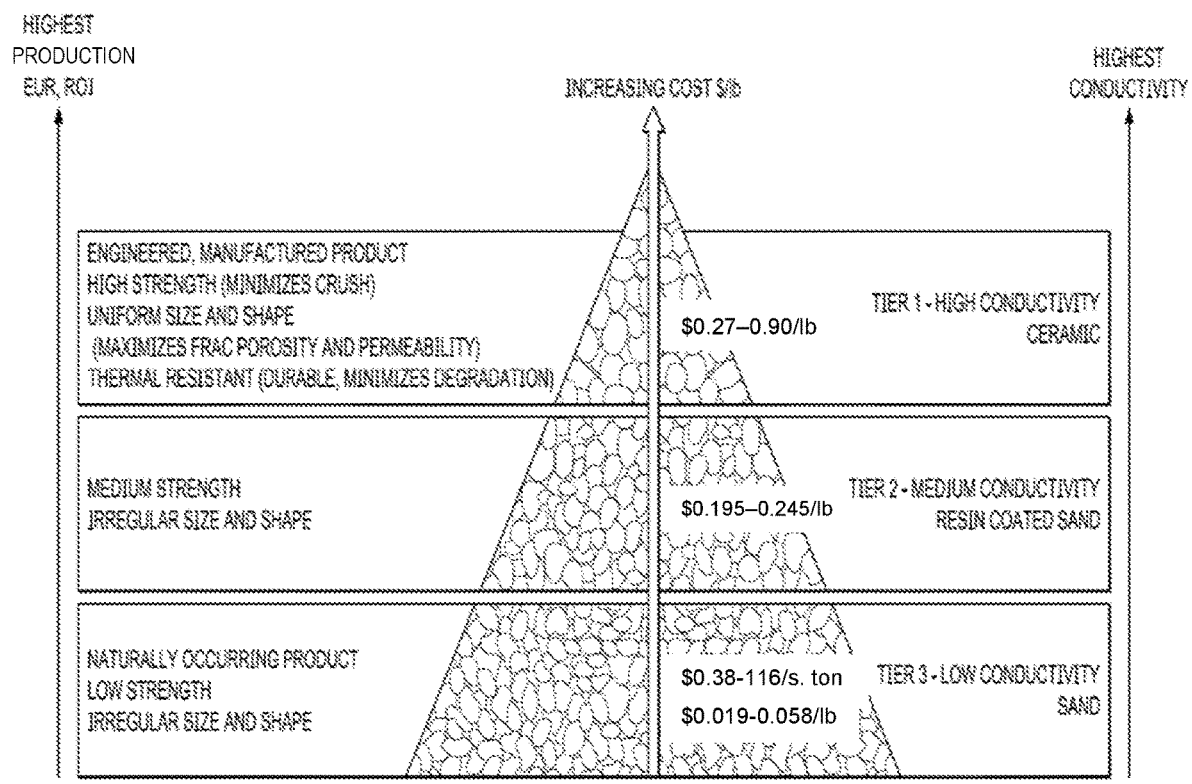
FIG. 2 Exemplary sand and ceramic proppants.
Figure 3:
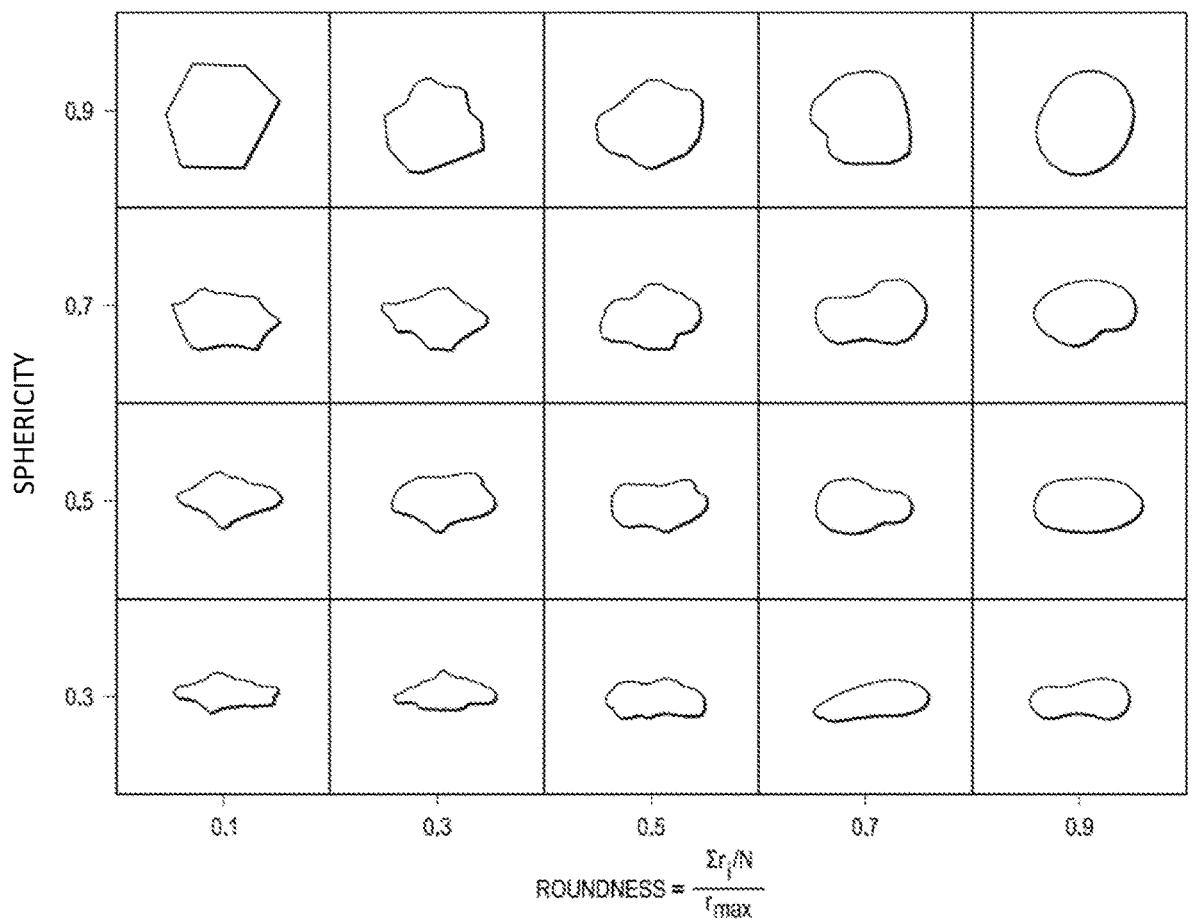
FIG. 3. Sphericity and roundness.
Figure 4:
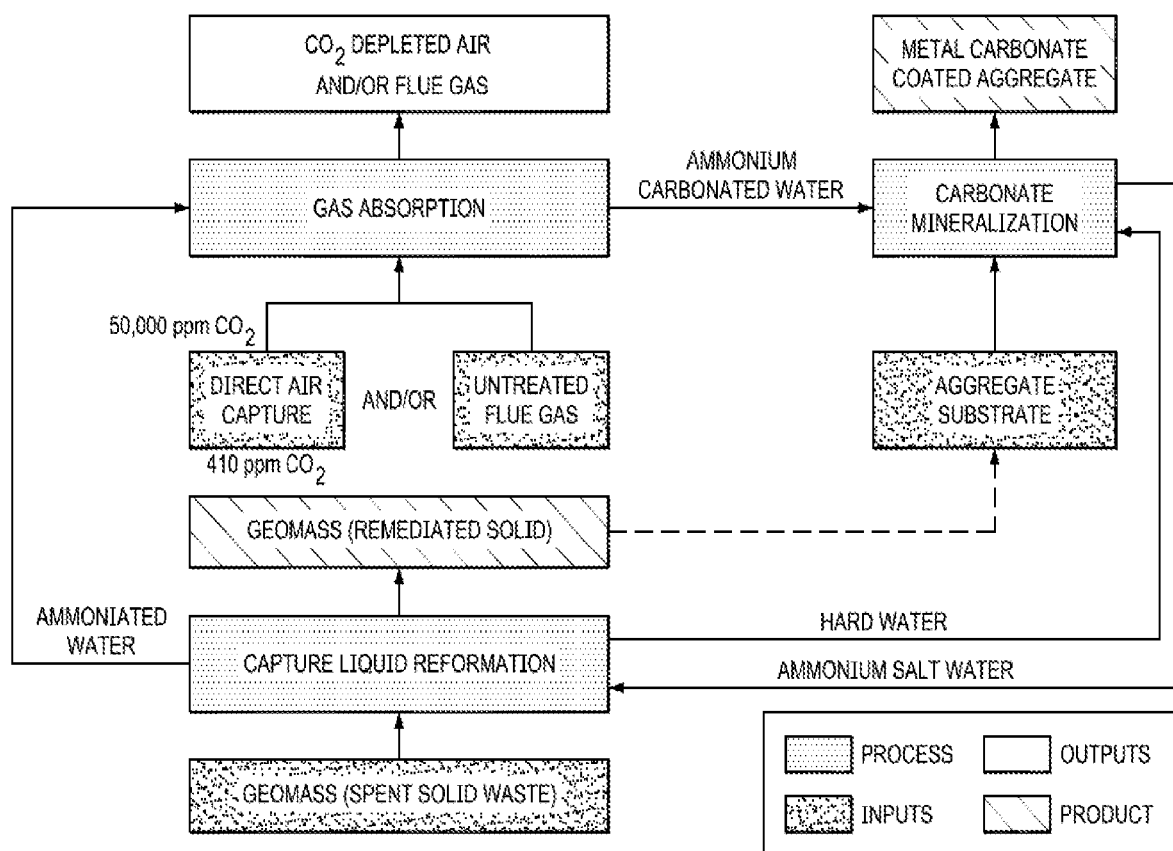
FIG. 4 Blue Planet carbon capture and mineralization process.
Figure 5:
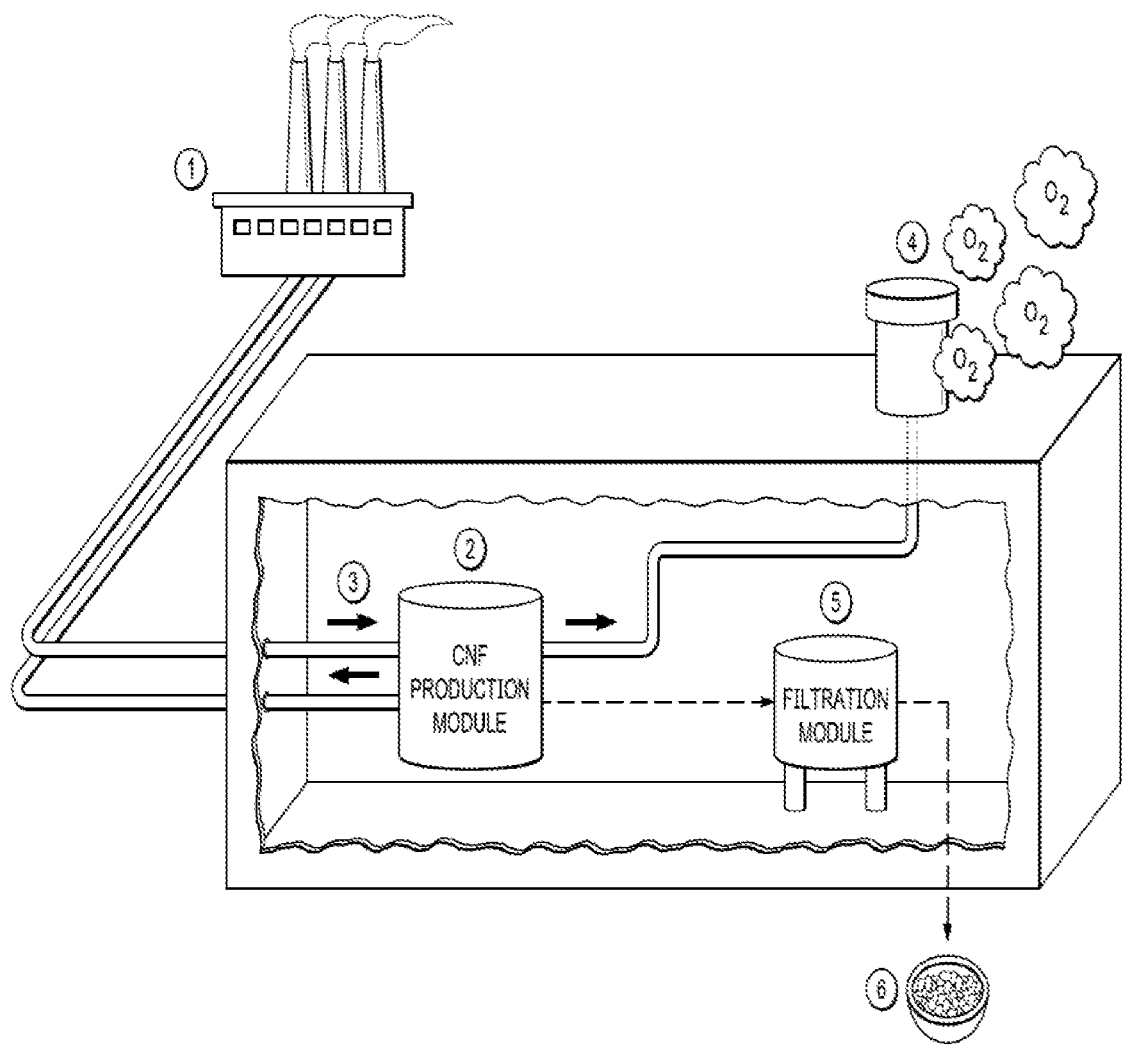
FIG. 5 Bergen Carbon Solutions carbon capture and manufacture of CNM process.
Figure 6:
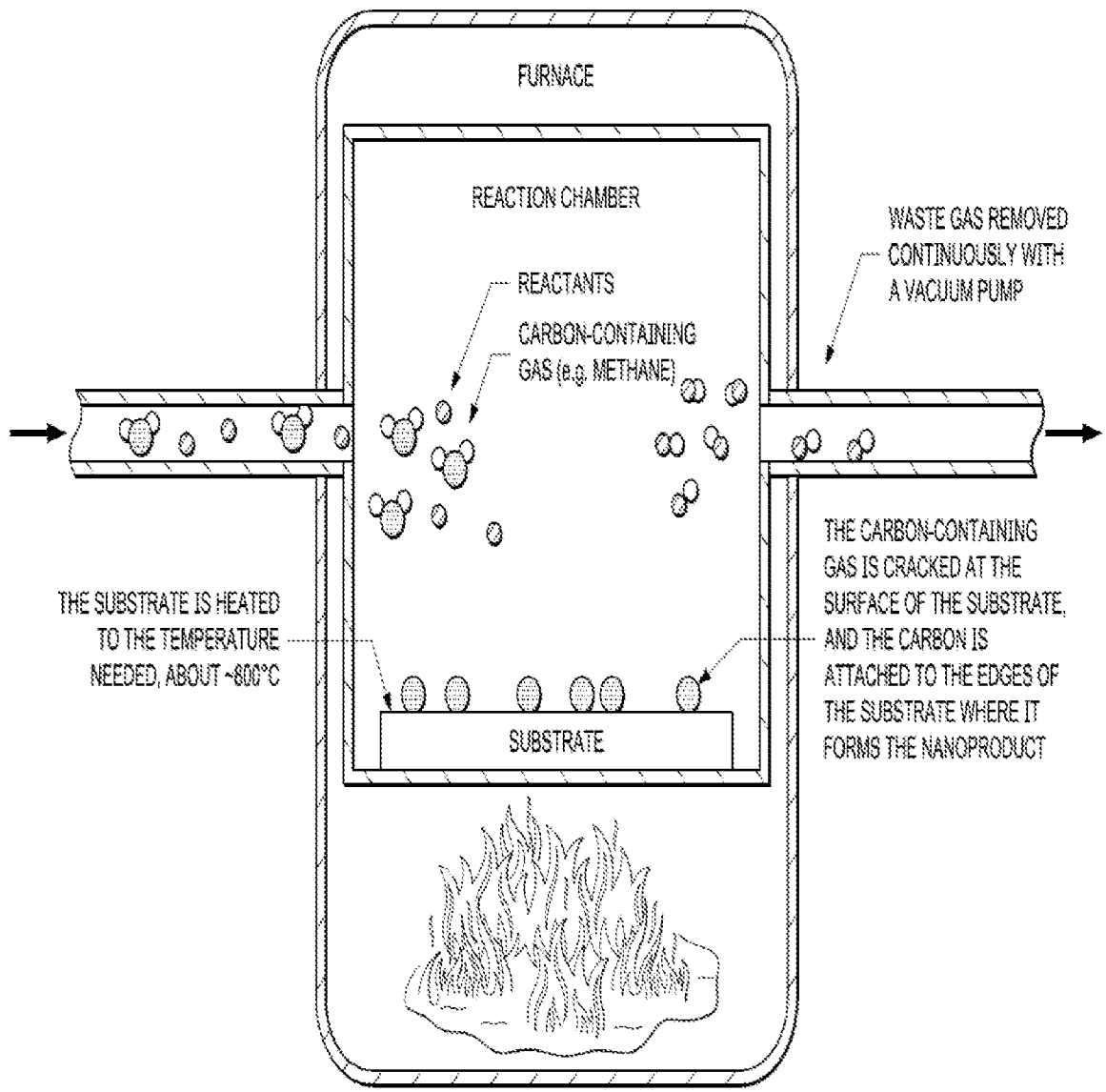
FIG. 6 Closeup of reactor in FIG. 5.

The disclosure provides a novel proppant, method of making same, and methods of using same in hydraulic and other types of fracturing of oil, gas, and water wells.

The examples herein are intended to be illustrative only, and not unduly limit the scope of the appended claims.

Carbon Mineralization

In one embodiment, particulates are made by contacting a gaseous source of $CO_2$ (such as flue gas or $CO_2$ from a direct air capture (DAC) system) and an aqueous capture ammonia to produce a solid carbonate product and an aqueous ammonium salt, and then contacting the aqueous ammonium salt liquid with a geomass, e.g., alkaline waste product such as recycled cement, to regenerate the aqueous capture ammonia.

In some embodiments, combination of the $CO_2$ capture liquid and gaseous source of $CO_2$ results in production of an aqueous carbonate, which aqueous carbonate is then subsequently contacted with a divalent cation source, e.g., a $Ca^{2+}$ and/or $Mg^{2+}$ source, to produce the $CO_2$ sequestering material. In yet other embodiments, a one-step $CO_2$ gas absorption carbonate precipitation protocol is employed.

Any convenient cation source may be employed in such instances. Cation sources of interest include, but are not limited to, the brine from water processing facilities such as sea water desalination plants, brackish water desalination plants, groundwater recovery facilities, wastewater facilities, blowdown water from facilities with cooling towers, produced water and the like, which produce a concentrated stream of solution high in cation content. Also of interest as cation sources are naturally occurring sources, such as but not limited to native seawater and geological brines. In some instances, the cation source may be a waste product of another step of the process, e.g., a calcium salt (such as $CaCl_2$) produced during regeneration of ammonia from the aqueous ammonium salt.

In yet other embodiments, the aqueous capture ammonia includes cations, e.g., as described above. The cations may be provided in the aqueous capture ammonia using any convenient protocol. In some instances, the cations present in the aqueous capture ammonia are derived from a geomass used in regeneration of the aqueous capture ammonia from an aqueous ammonium salt. In addition, and/or alternatively, the cations may be provided by combining an aqueous capture ammonia with a cation source, e.g., as described above.

The gaseous source of $CO_2$ can be waste streams produced by industrial plants that combust fossil fuels, e.g., coal, oil, natural gas, as well as man-made fuel products of naturally occurring organic fuel deposits, such as but not limited to tar sands, heavy oil, oil shale, etc. In certain embodiments, power plants are pulverized coal power plants, supercritical coal power plants, mass burn coal power plants, fluidized bed coal power plants, gas or oil-fired boiler and steam turbine power plants, gas or oil-fired boiler simple cycle gas turbine power plants, and gas or oil-fired boiler combined cycle gas turbine power plants. Direct capture from air may also be used.

Geomass can be mine tailings, mining dust, sand, baghouse fines, soil dust, dust, cement kiln dust, slag, steel slag, iron slag, boiler slag, coal combustion residue, ash, fly ash, slurry, lime slurry, lime, kiln dust, kiln fines, residue, bauxite residue, demolished concrete, returned concrete, crushed concrete, recycled concrete, recycled mortar, recycled cement, demolished building materials, recycled building materials, recycled aggregate, etc.

Carbon Nanomaterials

Carbon dioxide is electrochemically decomposed to carbon and oxygen gas in molten LiCl-5.0 wt. % $Li_2O$ molten salts at 903 K (629.8° C.) using a titanium cathode and inert platinum anode (Li 2016). $CO_2$ chemically dissolves into the LiCl—$Li_2O$ melt by reacting with $Li_2O$, changing the electrolyte LiCl—$Li_2O$—$CO_2$ into $Li_2CO_3$ and LiCl. Carbonate anions are electrochemically reduced to carbon on the cathode, while oxygen complexes of carbonate anions are oxidized at the anode, generating $O_2$. Electrolysis of the LiCl-5.0 wt. % $Li_2O$ molten salt under a $CO_2$ atmosphere at 0.05 A/cm$^2$ in Li (2015) yielded anodic gas with a $CO_2/O_2$ ratio of 0.42. The $CO_2/O_2$ ratio increased with increasing current density.

$CO_2$ can also be dissolved into carbonates and electrochemically split to produce CNM. Carbon deposition in $CaCO_3$, $SrCO_3$ and $BaCO_3$ dissolved electrolyte occurs and carbon products aggregate on the cathodic surface, and then collected. Li (2018) demonstrated that the alkaline earth carbonate additives sustained continuous $CO_2$ electrolysis and carbon electro-deposition. However, the micromorphology and microstructure of the carbon deposits were found to be significantly changed mainly because of the interface modification induced by the alkaline earth carbonate additives. However, such changes may not present problems for proppant use, plus higher yields may be obtained by optimizing the electrolytic conditions. Compared to pure $Li_2CO_3$, alkaline earth carbonate additives provide the carbon nanotubes with a thicker diameter and more prominent hollow structure.

Tables

TABLE 1

Properties of 20/40 ceramic proppants and sands.

| Type of proppants | Ceramic | Sand |
|---|---|---|
| Mesh range (mesh) | 20/40 | 20/40 |
| Bulk density (g/cm$^3$) | 1.58 | 1.59 |
| Apparent density (g/cm$^3$) | 2.84 | 2.63 |
| Average diameter (μm) | 617 | 658.3 |
| Turbidity (FTU) | 14 | 37 |
| Roundness (dimensionless) | 0.8 | 0.7 |
| Sphericity (dimensionless) | 0.8 | 0.7 |
| Acid-solubility (%) | 6.9 | 7 |
| Crushing rate (%) | 5 (effective closure stress = 52 MPa) | 9 (effective closure stress = 28 MPa) |

TABLE 2

Frack Fluids

| Base Fluid | Fluid Type | Main Composition |
|---|---|---|
| Water based | Slickwater | Water + sand (+chemical additives which may include surfactant, friction reducer, scale inhibitor, and biocide) |
| | Linear fluids | Gelled water, GUAR < HPG, HEC, CMHPG |
| | Cross-linked fluid | Crosslinker + GUAR, HPG, CMHPG, CMHEC |
| | Viscoelastic surfactant gel fluids | Electrolite + surfactant |
| Foam based | Water based foam | Water and Foamer + $N_2$ or $CO_2$ |
| | Acid based foam | Acid and Foamer + $N_2$ |
| | Alcohol based foam | Methanol and Foamer + $N_2$ |
| Oil based | Linear fluids | Oil, Gelled Oil |
| | Cross-linked fluid | Phosphate Ester Gels |
| | Water Emulsion | Water + Oil + Emulsifiers |
| Acid based | Linear | — |
| | Cross-linked | — |
| | Oil Emulsion | — |
| Alcohol based | Methanol/water mixes or 100% methanol | Methanol + water |
| Emulsion based | Water-oil emulsions | Water + Oil |
| | $CO_2$-methanol | $CO_2$ + water + methanol |
| | Others | — |

TABLE 2-continued

| Frack Fluids | | |
|---|---|---|
| Base Fluid | Fluid Type | Main Composition |
| Other fluids | Liquid $CO_2$ | $CO_2$ |
| | Liquid nitrogen | $N_2$ |
| | Liquid helium | He |
| | Liquid natural gas | LPG (butane and/or propane) |

The following references are incorporated by reference in their entirety for all purposes.

Czaplicka, N. Utilization of gaseous carbon dioxide and industrial Ca-rich waste for calcium carbonate precipitation, Energies, 13: 6239 (2020).

Li, L., et al. Electrochemical conversion of $CO_2$ to carbon and oxygen in $LiCl$—$Li_2O$ melts, Electrochimica Acta 190:655-658 (2015).

Li, Z., et al. Carbon dioxide electrolysis and carbon deposition in alkaline-earth-carbonate-included molten salts electrolyzer, New Journal of Chemistry 42(19) (2018).

Liu, M.; Greeshma Gadikota, G. Integrated $CO_2$ capture, conversion, and storage to produce calcium carbonate using an amine looping strategy, Energy Fuels 33, 3, 1722-1733 (2019).

U.S. Ser. No. 10/343,199 Production of secondary aggregates.

U.S. Ser. No. 10/960,350 Ammonia mediated carbon dioxide ($CO_2$) sequestration methods and systems.

US20060039853 Separation of carbon dioxide ($CO_2$) from gas mixtures by calcium based reaction separation ($CaRS$—$CO_2$) process.

US2019119158 Improved production of aggregates.

US2020370001 Carbon sequestration methods and systems, and compositions produced thereby.

US2021069669 Continuous carbon sequestration material production methods and systems for practicing the same.

U.S. Pat. No. 7,753,618 Rocks and aggregate, and methods of making and using the same.

U.S. Pat. No. 8,470,282 Production of calcium carbonate.

U.S. Pat. No. 9,266,057 Process or separating and enriching carbon dioxide from atmospheric gases in air or from atmospheric gases dissolved in natural water in equilibrium with air.

U.S. Pat. No. 9,707,513 Alkali enrichment mediated $CO_2$ sequestration methods, and systems for practicing the same.

WO2019231334 Apparatus and method for purification of carbon nanomaterial.

The invention claimed is:

1. A method of making a proppant for use in hydraulic fracturing of a well, said method comprising:
   a) capturing $CO_2$ from a flue gas stream or from air;
   b) reacting said captured $CO_2$ with electricity or heat or both to produce carbon nanomaterial (CNM);
   c) sonication and/or filtration of said CNM;
   d) optional shaping said CNM by vacuum forming or molding or agglomeration;
   e) said CMN having:
      (1) a crushing rate of <10% at 28 MPa,
      (2) a bulk density of 1.5-2.5 $g/cm^3$,
      (3) a size of 0.1-2 mm, and
      (4) a porosity of 30-50%;
   f) size sorting said CMN to produce a size range of 20 mesh to 40 mesh, said size sorted CNM being suitable for use as a proppant.

2. The method of claim 1, said heat being about 800° C.

3. The method of claim 1, said CNM further having a roundness of at least 0.7 and a sphericity of at least 0.7.

4. The method of claim 1, further comprising coating said CNM with a resin, a thermoplastic polymer or an adhesive polymer.

5. The method of claim 1, further comprising combining said proppant with magnetic particles.

6. The method of claim 1, said CNM having a crushing rate of <10% at 40 MPa.

7. The method of claim 1, where said particles are agglomerated to produce sizes larger than 100 nm.

8. The method of claim 1, where said particles are agglomerated and coated to produce sizes larger than 100 nm.

9. A method of making a proppant for use in hydraulic fracturing of a well, said method comprising:
   a) capturing $CO_2$ from air or a flue gas stream;
   b) reacting said captured $CO_2$ with electricity or heat or both to produce carbon nanomaterial (CNM);
   c) sonication and/or filtration of said CNM;
   d) optional shaping said CNM by vacuum forming or molding or agglomeration;
   e) said CMN having:
      (1) a crushing rate of <10% at 28 MPa,
      (2) a bulk density of 1.5-2.5 $g/cm^3$,
      (3) a size of 0.1-2 mm, and
      (4) a porosity of 30-50%;
   f) size sorting said CMN to produce a proppant having a size range between 20 mesh and 40 mesh.

10. The method of claim 9, said heat being about 800° C.

11. The method of claim 9, said CNM further having a roundness of at least 0.7 and a sphericity of at least 0.7.

12. The method of claim 9, further comprising coating said CNM with a resin, a thermoplastic polymer or an adhesive polymer.

13. The method of claim 9, further comprising combining said proppant with magnetic particles.

14. The method of claim 9, said CNM having a crushing rate of <10% at 40 MPa.

15. The method of claim 9, where said particles are agglomerated to produce sizes larger than 100 nm.

16. The method of claim 9, where said particles are agglomerated and coated to produce sizes larger than 100 nm.

17. A proppant made by the method of claim 9.

18. A method of producing oil or gas from an underground formation having at least one well, comprising the method steps of:
   a) introducing a first fracturing fluid (FF) through said at least one well into the underground formation at a pressure greater than a minimum in-situ rock stress for formation of fractures (FR) in the underground formation;

b) introducing a second FF containing the proppant of claim 17 through said at least one well into the underground formation to prop open said FR; and
c) producing oil or gas from said at least one well.

* * * * *